United States Patent [19]

Magistro

[11] Patent Number: 4,485,081
[45] Date of Patent: Nov. 27, 1984

[54] HYDROGEN CHLORIDE RECOVERY PROCESS

[75] Inventor: Angelo J. Magistro, Brecksville, Ohio

[73] Assignee: The B. F. Goodrich Company, Akron, Ohio

[21] Appl. No.: 470,349

[22] Filed: Feb. 28, 1983

[51] Int. Cl.$^3$ ................................................ C01B 7/01
[52] U.S. Cl. ...................................... 423/481; 423/240
[58] Field of Search ............... 423/240 S, 240 R, 481, 423/488, 462, 472, 437, 486; 260/694; 570/245; 502/313, 316, 331, 337

[56] References Cited

U.S. PATENT DOCUMENTS 3,453,073  7/1969  Sims ..................................... 423/481
3,845,191 10/1974  Bruce, Jr. ......................... 423/240 S Primary Examiner—Earl C. Thomas
Assistant Examiner—Jeffrey E. Russel
Attorney, Agent, or Firm—Alfred D. Lobo; Alan A. Csontos

[57] ABSTRACT

Oxidation of chlorinated hydrocarbons ("CHC") is effected in a fluidized bed of alumina catalyst-support on which is deposited a "soft" metal as the active catalytic ingredient, and the bed is fluidized with a nitrogen-free oxygen-containing stream of HCl gas, in conjunction with steam. The steam, in a particular range of proportions relative to the HCl, stifles the production of free Cl without blinding the active catalyst sites so that conversion of the CHCs is always at least 95%. The process comprises contacting the CHCs in the vapor phase with a fluidized bed of a catalyst-support on which is deposited an effective amount of iron, or copper, or both, in an active form, sufficient to convert in excess of 95% of the CHC on a molar basis, and the bed is fluidized with HCl, superheated steam and oxygen substantially free of nitrogen.

In a particular embodiment using a single ("catoxid") reactor, the effluent is purged of water, unconverted CHCs, CO$_2$ and some HCl, and the remaining predominantly HCl stream is recycled to the catoxid reactor. In another embodiment of the invention, the effluent from the catoxid reactor is fed to a second ("oxy") reactor to recover the HCl values by reaction with ethylene, air and HCl to produce 1,2-dichloroethane; the effluent from the catoxid reactor helps to fluidize the catalyst in the oxy reactor.

11 Claims, 2 Drawing Figures

HYDROGEN CHLORIDE RECOVERY PROCESS

BACKGROUND OF THE INVENTION

This invention relates to the generation of hydrogen chloride (HCl) by the catalytic conversion of halogenated hydrocarbons ("HHCs" for brevity), and more particularly to the generation of HCl in a fluidized bed of an alumina catalyst. The conversion to HCl and dischargeable products is particularly facilitated by an alumina support ("catalyst-support") for metals having a desirable catalytic action, which metals particularly include iron and/or copper. The HCl is recovered for reuse.

The problem of disposing of HHCs has confronted many persons skilled in the art. That this invention is directed to the same subject matter is evidence that the problem is fraught with difficulty, and the elusive best solution has yet to be preferred. Part of the difficulty lies with the varied considerations which define the problem, as it presents itself in different guises, hence the elusiveness of the solution; and by no means a minor part lies in the unforgiving economics of any solution to the problem. It is axiomatic that solutions to industrial problems must be economically acceptable.

As is well known, the economics of recovering HHCs from waste streams are such that, at present, the only viable alternative is conversion of the HHCs, provided such conversion results in an acceptably clean effluent for release into the environment. Thus, optimally, the HHCs are converted to carbon dioxide, water and HCl. Typically, the HCl is scrubbed out of the effluent with water in a scrubber, the aqueous acid is neutralized with lime and discarded.

A particular, early solution to the general problem of dispossal of HHCs was addressed in U.S. Pat. No. 3,140,155 where it is taught that the HHCs may be incinerated at a temperature in the range from about 900° C. to 1300° C. in a furnace specially designed to minimize the hazards of explosion. Notwithstanding the merits of the furnace, such incineration of HHCs was eschewed in favor of their catalytic conversion, as for example, described in U.S. Pat. No. 3,705,010 which teaches that brominated HHCs may be catalytically converted, without the hazards of incineration (non-catalytic) over particular metal oxides such as $Cr_2O_3$, $V_2O_3$, $Mo_3O_8$, $WO_2$, $CeO_2$, $U_3O_8$ and the like, supported on conventional supports such as alumina, using an excess of oxygen to convert the brominated HHC.

Another teaching which favors the catalytic conversion of HHCs is found in U.S. Pat. No. 3,453,073 which discloses that water and HHCs with necessary oxygen, passed over a bed of acid-type catalyst at a temperature in the range from about 300° to about 600° C., produces the desired HCl when the HHCs are chlorinated. The water must be present in at least a stoichiometric amount, that is, one mole of water for each mole of halogen on a monoatomic basis. The favored catalyst is phosphomolybdic acid deposited on catalyst-supports such as active carbon, silica-alumina, chromia-alumina and the like.

It is evident that catalytic conversion of HHCs is the preferred mode for their disposal and, if desired, the HCl may be recovered and recycled, but as is true of any catalytic conversion, some catalysts are more preferred than others for a host of reasons. The process of this invention is particularly directed to such a preferred catalyst which, coincidentally, is generally disclosed in the prior art for other purposes, specifically the oxidation, ammoxidation and oxyhydrochlorination of monoolefins, as in U.S. Pat. No. 4,226,798, inter alia. This prior art catalyst, like the catalyst used in the present invention, comprises an alumina catalyst-support on which is deposited a "soft" element of Groups I, V, VI and VIII of the Periodic Table, and compounds thereof. Such one or more soft elements may be deposited conventionally from salt solutions prior to use in the reaction, or the elements may be deposited in situ during the reaction. Specific soft metals are copper, iron, bismuth, antimony and the like which additionally may be promoted by the rare earth elements and elements of Groups II, IV, and VII.

Though much desired from the standpoint of the catalytic conversion of HHCs, such a catalyst unfortunately displays the peculiar phenomenon described as "tackiness" or "stickiness", which is not necessarily viscosity as conventionally defined. Stickiness is defined as the degree of particle-to-particle agglomeration, viscosity or resistance to separation of consitituent particles. This proclivity of stickiness attributable to the catalyst is described in greater detail in the '798 reference, the disclosure of which is incorporated by reference thereto as if fully set forth herein.

As stated in the '798 reference, this stickiness is attributable to the presence of an excess of HCl. Therefore, in the oxyhdrochlorination of ethylene to produce 1,2-dichloroethane ("EDC"), it is essential that a bare minimum of excess HCl be fed to the reactor if maximum conversion of ethylene is to be obtained, both from the standpoint of effective use of the reactants, as well as from the standpoint of minimizing the corrosive effects of chlorine. Thus, despite the desirable effectiveness of a "soft metal" catalyst, it was expected that stickiness of the catalyst with an excess of HCl would rule out the use of a bed of such a catalyst fluidized with an excess of HCl. Further, it was found that catalytic oxidation of HHCs which are chlorinated ("CHCs" for brevity) while fluidized with HCl without added steam, substantially decreased the conversion of CHCs. Yet, because of heat-transfer considerations, it is essential that a fluid-bed reactor be used if the process is to be an economically viable one; and, because of the known effective conversion of HHCs by the prior art catalyst, it was highly desirable to use it in a fluid-bed reactor.

Recognizing that fluidization is a necessary condition for an economical process, and this process requires oxygen, it is logical to use air as the gaseous medium. This would normally present no difficulty in the situation where the effluent from the bed is to be vented to the atmosphere, or recycled to a process where handling the nitrogen in the air is not penalized with undue costs. However, where the effluent is desirably recycled to a process where nitrogen is a burden, another choice must be made. A choice of oxygen, without nitrogen, in an amount sufficient to fluidize the bed, not only is more of an expense than the expense of handling the nitrogen as air, but pure oxygen in excess is not only an obvious explosion hazzard, but also deleterious to the catalyst.

Another choice is predicated upon the face that water is a product of the catalytic combustion of HHCs. Though steam is the next logical choice, acting, as suggested in the '073 reference, as a diluent, experimental evidence presented herebelow indicates that injecting steam to help fluidize a reactor containing the catalyst ("fluidization steam") adversely affects the conversion of the HHCs, presumably because the active sites of the catalyst are "blinded" by the injected steam.

Still other major products resulting from the conversion of HHCs are carbon dioxide and HCl or HBr, depending upon whether the HHCs are chlorinated or brominated, and these products also offer themselves as choices. However, though the effect of HBr in a fluidized bed of supported soft metal catalyst is not known, HCl has already been taught to create an undesirable stickiness problem in a fluid bed. Further, use of HCl would be expected to produce chlorine when mixed with oxygen and contacted with catalyst at a temperature above 350° C., which reaction is the basis for the erstwhile Deacon process. Such production of chlorine is highly corrosive, and is proscribed, as taught in U.S. Pat. Nos. 4,031,149 and 4,169,862. More important, free chlorine at a temperature in the range specified herein for our process, results in chlorinating EDC (and any other less chlorinated HHCs) to perchloroethylene, hexachlorobenzene, hexachloroethane and the like which, being highly chlorinated HHCs are known to defy conversion under the process conditions tolerated by the equipment.

Weighing the foregoing choices, it is apparent that any choice of a fluidization medium which is also a product of the conversion of CHCs is likely to decrease such conversion of CHCs because of the law of mass action, irrespective of the effect of the medium on the catalyst, or the cost of using that medium. Thus, the choice of HCl, $CO_2$ or steam in the large amounts necessary to fluidize a bed, would be deemed undesirable.

We are well-acquainted with the oxyhydrochlorination of ethylene (the "oxy" process) and, recognize that in this oxy process it would be highly desirable to recycle unconverted EDC and HCl which are produced by the conversion of undesirable CHCs in another reactor, as is disclosed in U.S. Pat. Nos. 3,968,200 and 4,351,819. However, to utilize such a recycle in which HCl is a desirable component, the problem to be solved was to counter the obvious disadvantages of using HCl as the fluidization medium, or in so large an excess that it constituted a substantial if not major portion of the medium. An acceptable solution required that the effectiveness of the catalyst with respect to converting essentially all the HHCs, be maintained. The process of this invention provides such a solution.

SUMMARY OF THE INVENTION

It has been discovered that a fluidized bed of alumina catalyst-support on which is deposited a "soft" metal as the active catalytic ingredient, effectively converts unwanted by-product HHCs to desired products when the bed is fluidized with a nitrogen-free oxygen-containing stream of HCl gas, in conjunction with steam.

It is therefore a general object of this invention to provide a process for the conversion of chlorinated hydrocarbon ("CHC") material to HCl, $CO_2$ and water, comprising, contacting the material in the vapor phase with a fluidized bed of a catalyst-support on which is deposited an effective amount of iron, or copper, or both, in an active form, sufficient to convert in excess of 95% of the CHC on a molar basis, and the bed is fluidized with HCl, superheated steam and oxygen substantially free of nitrogen.

It is a specific object of this invention to convert a by-product stream of unwanted CHCs including a little EDC, less than about 20% by volume of the CHCs, to HCl, $CO_2$, CO and water in a fluid-bed reactor (referred to as a "catoxid" reactor), by fluidizing a bed of an alumina catalyst containing iron and/or copper with a fluidizing stream consisting essentially of a major amount of HCl, and minor amounts (relative to the HCl) of superheated steam and oxygen essentially free of nitrogen, then purging a preselected amount of a purge stream comprising water, unconverted CHCs and $CO_2$, and recycling the remaining predominantly HCl stream ("recycle stream") to the catoxid reactor.

It is another specific object of this invention to convert a by-product stream of unwanted CHCs in a catoxid reactor as recited immediately hereinabove, then directly use the effluent from this reactor to recover HCl in the effluent by reacting it with ethylene and $O_2$ in a second fluid-bed reactor (referred to as an "oxy" reactor). The HCl assists in fluidization and is converted into 1,2-dichloroethane ("EDC"), thus recovering Cl values; alternatively, the effluent from the catoxid reactor may be purged of a predetermined portion of $CO_2$, water and unconverted CHCs, and the remaining stream ("recycle stream") used in the oxy reactor.

BRIEF DESCRIPTION OF THE DRAWINGS

The foregoing and other objects and advantages of my invention will appear more fully from the following description, made in connection with the accompanying flow-sheets schematically illustrating preferred embodiments of the invention, wherein like reference characters refer to the same or similar parts in each of the flow-sheets and in which.

DETAILED DESCRIPTION OF PREFERRED EMBODIMENTS OF THE INVENTION

Figure 1:
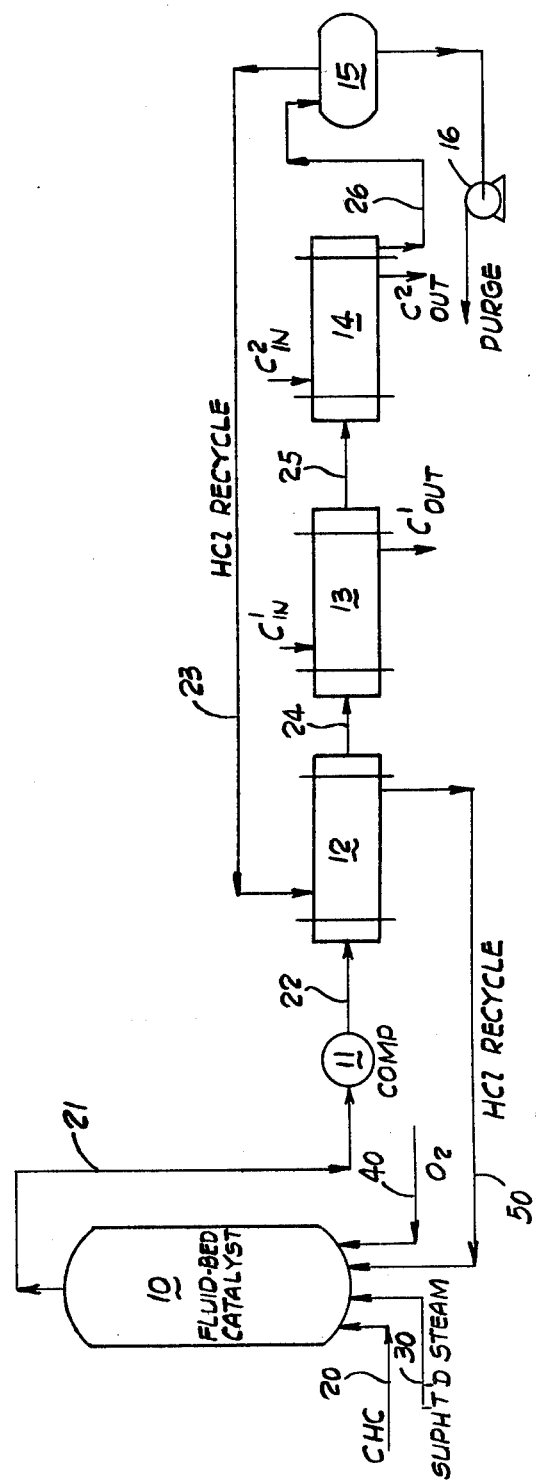
FIG. 1 is a simplified schematic flow diagram of the invention wherein the effluent from a catoxid reactor is processed to provide a HCl stream for recycle to the catoxid reactor, and a purge stream of $CO_2$, water and unconverted CHCs.

In each of the two embodiments described hereinbelow, our process is applicable to the disposal of any CHC material in a physical form suitable to be fed to a fluid-bed catoxid reactor. Even solid pulverized poly(vinyl chloride) ("PVC") waste may be used. Since disposal is by oxidation, the desired reaction is not an oxychlorination or chlorination of the CHC and requires only sufficient oxygen to satisfy the stoichiometric requirements of the CHC fed to the reactor. It will be appreciated that some CO is also formed in addition to the $CO_2$ and that the heat of reaction (of oxidation) provides the major amount of the heat required to keep the catoxid fluid-bed reactor operating at a tolerably high temperature. For practical reasons, the process of this invention would be inapplicable to a fixed bed reactor.

Typically the CHC material includes chloroform, ethyl chloride, trichloroethanes, trichloroethylenes, tetrachloroethanes, hexachloroethanes, and hexachlorobutadiene, as well as some chlorinated aromatic compounds. It is desirable to make periodic analyses of the CHC stream to be converted to regulate the amount of oxygen supplied to the reaction.

In this invention, oxygen is supplied in a relatively pure form, and in any event not as air, or containing a major amount of a diluent. Most preferred is industrially produced oxygen such as is available for bulk usage. A slight excess of oxygen in the range from about 5 to about 30% over stoichiometric is most preferred. Because of the presence of an excess of HCl used herein, a further excess of oxygen results in formation of aluminum chloride in the catalyst which chloride may either be vaporized and lost, or converted to aluminum hydroxide which serves to inactivate the catalyst.

Particular reference is made hereinafter to the use of HCl since the suitability of other analogous halogen acid gases in this specific application is not known. HCl is used as the major gaseous component which provides the energy to fluidize a bed of alumina catalyst. This catalyst consists essentially of an alumina support on which is deposited a soft metal as the active catalytic ingredient, hence referred to herein as an "alumina catalyst". Most preferred is an attrition-resistant alumina catalyst impregnated with at least one of the soft metals, generally iron and/or copper, the iron being present in the range from about 0.5 percent by weight (% by wt) to about 5% by wt based on the total weight of catalyst, and when an additional soft metal such as copper is present, optionally with a promotor identified hereinbefore, the copper is present in a minor proportion relative to the iron, the range of copper being from 0.1% to about 5% by wt. The manner in which the soft metal is deposited on the catalyst is not critical, any conventional manner including deposition in situ during the reaction, being acceptable.

Even if the alumina catalyst used in the catoxid reactor is not the same as the most preferred catalyst used in the oxy reactor, there is sufficient metal, particularly iron, present on the catalyst to inculcate the same characteristic of stickiness referred to hereinbefore and in the '798 patent.

Though the alumina catalyst used in the catoxid reactor is known to convert CHCs in the presence of steam, the conversion of the CHCs is decreased when excess steam is present without the HCl supplied to the fluidbed. This decrease is presumed to result from a decrease noted in the production of chlorine when HCl is not present, and also to a blinding of the active sites on the catalyst by the steam.

By excess steam we refer to more steam than the stoichiometric amount required to supply the H for the HCl which is to be formed by reaction with the chlorine generated in the reaction. It will be recognized that at the temperature of the reaction, namely in the range from about 400° C. to about 600° C., chlorine free radicals are always present, and are regenerated essentially instantaneously. These Cl radicals may combine with H generated from the CHC as well as H from the steam some of which is generated by conversion of the CHC. Thus, it is desirable to make an analysis of the CHC stream before setting the amount of steam to be supplied to the bed of the reactor. Typically, the ratio of H to Cl in the CHC will range from about 1:1 to about 1:2, and more specifically, in the case of CHCs from an oxy process, the range is from about 1.2:1.6.

The temperature at which the bed is to be maintained dictates that superheated steam be used under adequate pressure to assist in the fluidization of the bed. Since the function of steam is mainly to provide the H for the reaction, it would appear that an excess of steam would not be detrimental, and would have the additional advantage of aiding the economics of the process. This has been found to be untrue.

In a specific illustration, a CHC is formulated with a known composition consisting of a lightly chlorinated easily oxidized material, specifically EDC, and a highly chlorinated difficultly oxidized material, specifically perchloroethylene ("perc"). The temperature of the bed is maintained at 500° C. and the contact time is computed as the volume of the unfluidized bed of catalyst (liters) divided by the flow rate (liters/sec) of fluidizing gas.

This CHC (mixture of EDC and perc) is mixed with oxygen and steam in the proportion of 1:3.3:10.7 parts by volume, respectively, and used to fluidize a bed of alumina catalyst on which is deposited about 3% Fe and less than 1% by wt of Ni, Cr and Cu, with a contact time of 20 sec. Conversion of the perc is 82.5% and the EDC is 100% converted. When one-half (50% by vol) of the steam is replaced with $N_2$ the conversion of the perc is over 90%, the contact time being the same. When the proportion of CHC: oxygen:steam is changed to 1:3.3:16.9, the perc conversion falls to 78.4% though the contact time was increased to 27 sec. In all cases, the conversion of EDC is 100%. Since it is essential that the overall conversion of the CHC be at least 90% it is evident that a significant decrease in conversion of the difficultly chlorinated CHC is detrimental to the process.

Though specific contact times were determined for the particular illustrative runs referred to hereinabove, the contact time is not critical provided sufficient to convert at least 90% of the CHCs in the feed. In general, longer contact times will result in higher conversion of CHCs but excessively long contact times will serve only to magnify problems with heat transfer and increase the cost of operating the process. The optimum contact time will vary with the composition of the feed and the particular process parameters chosen but may be arrived at with the normal trial and error usual for such determinations, for a reactor of a given size to be operated at a preselected pressure.

The pressure at which the process operates is not critical though the efficiency of the process will vary with pressure. It is most efficient at elevated pressures in the range from about 10 psig to about 100 psig (lbs/in$^2$ gauge), which makes it particularly adaptable to complement a pressurized oxy reactor if HCl is to be recycled to the reactor, or if the effluent from the catoxid reactor is to be flowed directly to the oxy reactor.

It can be calculated that the amount of steam generated by conversion of the CHCs in situ (referred to as "CHC-steam") is insufficient to provide all the H necessary to combine with the Cl generated in situ. What could not be deduced was that the key to operation of our process without a net chlorine make, and without sacrificing conversion of CHCs, was to provide at least 1.5 mols of fluidizing steam (referred to as "added-steam") for each mol of CHC-steam. More preferably from 1.5 to about 6 mols of added-stream are used in combination with the aforespecified amount of oxygen, and, enough HCl to fluidize the bed.

From the foregoing it will be evident that if a net chlorine make can be tolerated, or is desired for some specific purpose, the process may be operated with less than 1.5 mols added steam, or no steam at all. However, it will be realized that the presence of chlorine at the elevated temperature of our process is corrosive, and favors conversion of EDC to perc, and of lightly chlorinated aromatics to highly chlorinated aromatics. Both perc and the highly chlorinated aromatics defy easy conversion to a dischargeable purge, and current economics preclude their recovery for market.

Referring now to FIG. 1 of the drawing there is schematically illustrated a flowsheet for the process of this invention wherein HCl gas is recovered for reuse in a catoxid reactor, referred to by reference numeral 10. This reactor is partially filled with an alumina catalyst of the type described generally in the '798 reference and particularly adapted for use in a fluidized state. The reactor is equipped with a catalyst support plate, a sparging grid, internal heat exchange means to maintain the temperature of the bed in the desired range, baffles to control the fluidization characteristics of the bed, and other apparatus conventionally used in such reactors, and not shown here.

CHCs to be converted are fed to the reactor through pipe 20 which enters the bottom of the reactor as do other pipes 30 and 40 which feed superheated steam and oxygen respectively. Another pipe 50 returns a HCl recycle stream to the reactor.

Effluent from the reactor leaves through pipe 21 and is compressed by compressor 11 before it is flowed through pipe 22 to a ceramic heat exchange 12 cooled by countercurrent flow with cool HCl recycle stream in pipe 23. The cooled effluent flows under high pressure through pipe 24 to a second titanium exchanger 13 cooled by countercurrent flow with a cooling stream $C_{in}^1$ which leaves as $C_{out}^1$. Cooled effluent, a portion of which is now liquid, flows through pipe 25 to a third teflon lined heat exchanger 14 cooled by countercurrent flow with a cooling stream $C_{in}^2$ which leaves the exchanger 14 as $C_{out}^2$. The cooled effluent flows through pipe 26 into a separator drum 15 in which the condensed liquid is separated from the gas (recycle stream) flashed off as essentially pure HCl containing equilibrium concentrations of $CO_2$ and water. The liquid condensate is an aqueous stream containing $CO_2$ and unconverted CHCs which stream is purged from the system by pumping it with pump 16 to a suitable disposal site. As will be apparent to one skilled in the art, the flow rates of the streams, and pressures and temperatures at various locations depends upon optimization of the operation of the system and is a matter of engineering, details of which are unnecessary herein.

Figure 2:
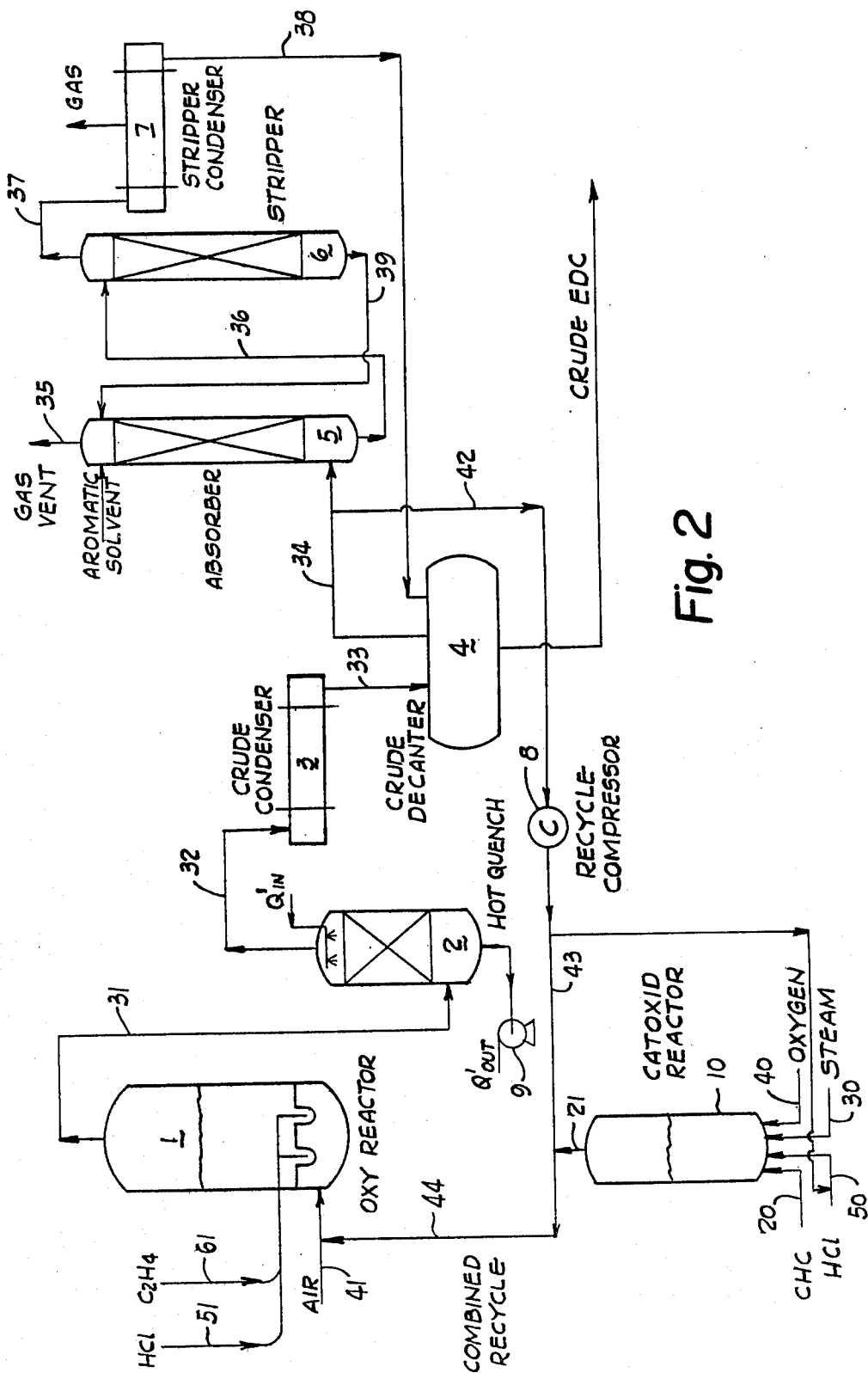
FIG. 2 is a simplified schematic flow diagram of the invention wherein the effluent from the catoxid reactor is supplied to assist in the fluidization of any oxy reactor, and the effluent from the oxy reactor is processed to provide a recycle stream containing nitrogen and a minor amount of unconverted EDC to the oxy reactor.

Referring now to FIG. 2 there is schematically illustrated a flowsheet for a second embodiment of this invention wherein the effluent from the catoxid reactor 10 is introduced directly into an appropriately equipped oxy reactor 1 which, like the catoxid reactor 10, is also a fluidized reactor into which air, HCl and ethylene in pipes 41, 51 and 61 respectively, are introduced.

Operation of the process as shown in this embodiment requires that the amount of steam in the combined recycle stream in pipe 44, which is the only source of steam to the oxy reactor, be necessarily kept below 15% by volume of the combined gas flow to the oxy reactor or the conversion of ethylene is unacceptably decreased.

The effluent from the oxy reactor 1 is flowed through pipe 31 to a quench tower 2 where the effluent is hot-quenched with water, preferably with a little alkali, to remove HCl in the effluent. The quench tower is packed with Berl saddles or other appropriate packing to improve contact of the gaseous effluent with the quench stream $Q_{in}^1$ which leaves the tower as aqueous stream $Q_{out}^2$ which is pumped away by pump 9. The overhead gaseous stream from the quench tower 2 is flowed through pipe 32 into a crude condenser 3 from which it is flowed through pipe 33 into a crude decanter 4. The liquid decanted from the decanter 4 is crude EDC.

The overhead gas from the decanter 4 is nitrogen containing a small quantity, less than 5% by volume of EDC which is led through pipe 34 to the bottom of an absorber 5, appropriately packed with gas-liquid contact-improving means. An aromatic solvent for the EDC is flowed countercurrently through the absorber to absorb the EDC, and the gas leaving the absorber through pipe 35 is led to an incinerator. The bottoms from the absorber containing crude EDC is flowed through pipe 36 to near the top of a stripper 6 provided with trays or other gas-liquid contact means to separate the crude EDC from unwanted gases. The overhead from the stripper 6 is flowed through pipe 37 into stripper condenser 7 in which the unwanted gases are flashed off and the condensate recycled through pipe 38 to the crude decanter 4.

Bottoms from the stripper 6 is returned through pipe 39 to absorber 5, near the top thereof. A portion of the overhead stream in pipe 34 is flowed to the absorber 5, the remaining being led through pipe 42 to recycle compressor 8 from which a portion is flowed through pipe 43 to the oxy reactor, the remaining portion being flowed through pipe 50 to the catoxid reactor. The flow through pipe 43 is combined with the flow from pipe 21 in pipe 44 as the entire effluent from the catoxid reactor is fed to the oxy reactor.

EXAMPLES 1–7

An alumina catalyst is prepared by impregnating a commercially available alumina support having a surface area of about 150 m$^2$/gm with an aqueous solution of $FeCl_3$, $CuCl_2$, $CrCl_3$ and $NiCl_3$ in amounts calculated to deposit 3.0% Fe, 0.2% Ni, 0.1% Cr and 0.05% Cu on the catalyst, and impregnation is effected in stages to ensure that the active ingredients are homogeneously distributed on and within the catalyst. Since the alumina support is the predominant factor in the effectiveness of the catalyst, and its surface area contributes to such effectiveness, the surface area of the alumina used is in the range from about 50 m$^2$/gm to about 200 m$^2$/gm it being understood that, after operation over an extended period of time, higher surface area catalysts will acquire surface area which are diminished. The impregnated catalyst is dried and calcined overnight at 520° C. before use.

The alumina catalyst is loaded into a laboratory tubular reactor so that the unfluidized catalyst occupies 150 cc. The reactor is equipped with conventional means to maintain it at a temperature of 500° C. and a pressure slightly above atmospheric. A pressure above about 10 psig is preferred for more efficient operation, but pressurized fluidization of the small reactor is difficult to control and not essential for the determinations to be made herein.

Heat-traced lines supply pure oxygen, HCl, superheated steam and a CHC stream made up of about 2 volumes of EDC per volume of perc. Fluidization is effected so that the contact time ("C.T.") of the CHCs is in the range from about 20 to 30 secs, though in a large reactor the contact time may be in the range from about 15 to about 45 secs.

In the following examples, percent conversion is given on a molar basis, in excess of 95% conversion indicating that for each mole of CHC feed, at least 0.95 mole is converted to oxidation products. The results of several runs are tabulated in Table I hereinbelow.

TABLE I

| Ex. | C.T. (sec) | Ratio of feed components | | | | Conversion % | Yield | | |
|---|---|---|---|---|---|---|---|---|---|
| | | CHC | $O_2$ | HCl | $H_2O$ | | % CO | % $CO_2$ | mm/min Cl |
| 1 | 19.5 | 1 | 3.3 | 9.05 | 3.1 | 100 | 1.1 | 98.9 | 0.1056 |
| 2 | 22 | 1 | 3.3 | 6.3 | 4.3 | 100 | 0.95 | 99.05 | 0.065 |
| 3 | 28 | 1 | 3.75 | 7.75 | 4.8 | 100 | 0.5 | 99.5 | 0.061 |
| 4 | 28 | 1 | 3.6 | 10.9 | 2.75 | 100 | 0.3 | 99.7 | 0.1705 |
| 5 | 20 | 1 | 3.3 | — | 10.7 | 93.5 | 1.5 | 98.5 | 0.0081 |
| 6 | 27 | 1 | 3.6 | — | 16.9 | 60. | 0.6 | 99.4 | 0.0049 |
| 7 | 28 | 1 | 3.6 | 12 | — | 92. | 0.2 | 99.3 | 0.22 |

The analyses were made with a Hewlett Packard 5840A gas chromatograph which was duly calibrated. The yield of Cl in the effluent is given as millimoles per minute (mm/min) as it was so measured. The presence of hot free chlorine in the effluent in an amount of about 1% by volume is deemed highly undesirable because of its corrosiveness, and it is most preferred to maintain the Cl level below about 1000 ppm. A level of 0.1 mm/min Cl is indicative of a chlorine level which is undesirable.

As can be seen from the foregoing data, the proportion of steam in examples 1 and 4 is insufficient to hold down the free Cl level in the effluent; increasing the contact time with the expectation of making more highly chlorinated materials simply increases the Cl level.

When only HCl is used, without steam, the level of Cl rises abruptly and the overall conversion of CHCs drops below 95%.

Hence, for preferred operation, the ratio of $CHC:O_2:HCl:H_2O$ is to be kept in the range from about 1:3:3:9 to about 1:5:6:6 it being evident that the combination of the $H_2O$ and the HCl is equivalent to the volume of nitrogen which would otherwise be used in a conventional catoxid reactor.

I claim:

1. A process for oxidizing a chlorinated hydrocarbon material mainly to carbon dioxide, hydrogen chloride and water, comprising,
   (a) contacting, in a catoxid reactor, said material and a gaseous mixture of hydrogen chloride, steam and oxygen essentially free of nitrogen, with an alumina catalyst containing at least iron and copper or compounds thereof,
   (b) controlling the flow of said mixture so as to provide
      (i) from 1.5 to about 6 equivalents of steam for each equivalent of steam generated in situ by oxidation of said material,
      (ii) an excess of oxygen in the range from about 5 to about 30 percent over that stoichiometrically required to oxidize said material, and
      (iii) enough HCl gas to fluidize said catalyst,
   so as to provide a ratio of the gaseous feed components, namely chlorinated hydrocarbons:oxygen:hydrogen chloride:steam in the range from about 1:3:3:9 to about 1:5:6:6, and,
   (c) operating said reactor with said catalyst in a fluidized sate at a temperature in the range from about 400° C. to about 600° C. and at a pressure in the range from about 10 psig to about 100 psig, whereby at least 95 percent on a molar basis of said material is oxidized.

2. The process of claim 1 wherein said iron is present in an amount in the range from about 0.5 percent to about 5 percent by weight, based on the total weight of catalyst.

3. The process of claim 2 wherein said catalyst includes in addition to iron, and copper present in an amount in the range from about 0.1% to about 5% by wt based on the weight of total catalyst, an additional element selected from the group consisting of nickel and chromium present in an amount in the range from about 0.1% to about 5% by wt based on the weight of total catalyst.

4. The process of claim 2 including separating said catoxid reactor's effluent into a gaseous hydrogen chloride stream and a purge stream, and, recycling a portion of said hydrogen chloride stream as a recycle stream to said catoxid reactor.

5. The process of claim 2 including flowing said catoxid reactor's effluent into an oxy reactor wherein ethylene, hydrogen chloride and an oxygen-containing gas are contacted with a fluidized bed of catalyst at elevated temperature and pressure to produce 1,2-dichloroethane.

6. The process of claim 3 wherein the operating pressure in said catoxid reactor is in the range from about 30 psig to about 75 psig.

7. The process of claim 6 wherein said chlorinated hydrocarbon material includes 1,2-dichloroethane present in an amount less than about 20% by volume of said material, and in addition, chloroform, ethyl chloride, trichloroethanes, trichloroethylenes, tetrachloroethanes, hexachloroethanes, and hexachlorobutadiene, as well as chlorinated aromatic compounds.

8. The process of claim 7 wherein the ratio of hydrogen to chlorine in said chlorinated hydrocarbon material is in the range from about 1:1 to about 1:2.

9. The process of claim 8 wherein the contact time within said catoxid reactor is in the range from about 15 sec to about 45 sec.

10. The process of claim 9 wherein said alumina catalyst has a surface area in the range from about 50 $m^2/gm$ to about 200 $m^2/gm$.

11. The process of claim 5 wherein the amount of steam to the oxy reactor is maintained below 15% by volume of the combined gas flow to the oxy reactor.

* * * * *